May 31, 1927.

G. M. KIRKPATRICK

FLUID SEPARATOR

Filed May 23, 1924

1,630,748

2 Sheets-Sheet 2

INVENTOR:
George M. Kirkpatrick
By E. J. Andrews
Atty.

Patented May 31, 1927.

1,630,748

UNITED STATES PATENT OFFICE.

GEORGE M. KIRKPATRICK, OF PITTSBURGH, PENNSYLVANIA.

FLUID SEPARATOR.

Application filed May 23, 1924. Serial No. 715,366.

This invention relates to improvements in fluid separator apparatus and it has for its object providing suitable apparatus for separating fluids, particularly in cases of fractional distillation or condensation of fluids, in order to limit the molecular nature of gases as may be desired, producing greater homogeneity in the gas and increasing its purity by eliminating not only vapors, gases or liquids of denser or rarer molecular nature, but also eliminating impurities such as particles of carbon and the like. It has for a further object producing an apparatus to be operating in such a manner as to prevent clogging of the apparatus by the accumulation of impurities. Other objects of the invention will be apparent upon a consideration of the accompanying drawings and the following description thereof.

Figure 1:
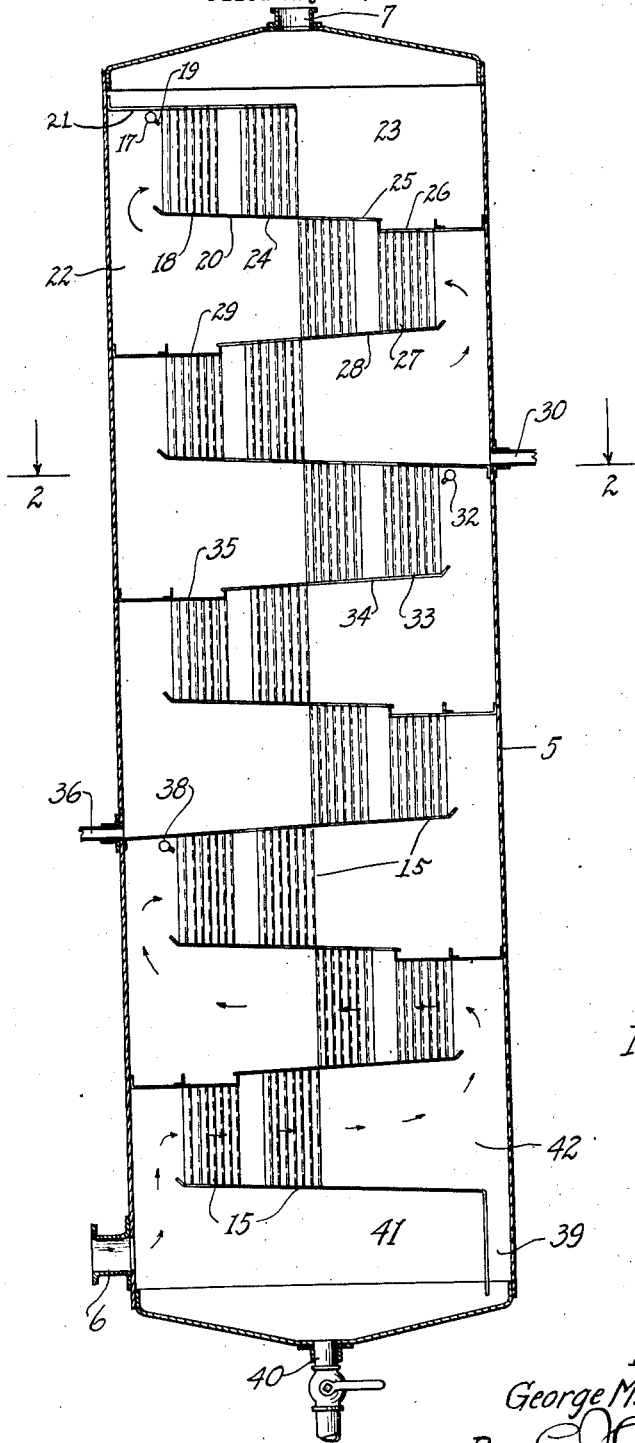
Figure 2:
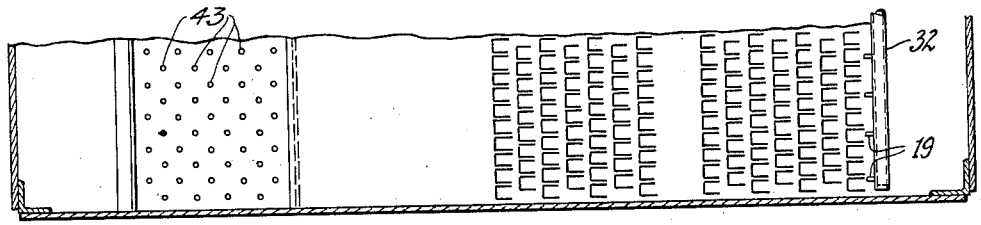

Of the drawings Fig. 1 is a vertical central sectional elevation of the separating and purifying apparatus which embody features of my invention; Fig. 2 is an enlarged view along the line 2—2 of Fig. 1; and Fig. 3 is a reduced elevation of the apparatus with other apparatus which is commonly used in fractional distillation work.

Figure 3:
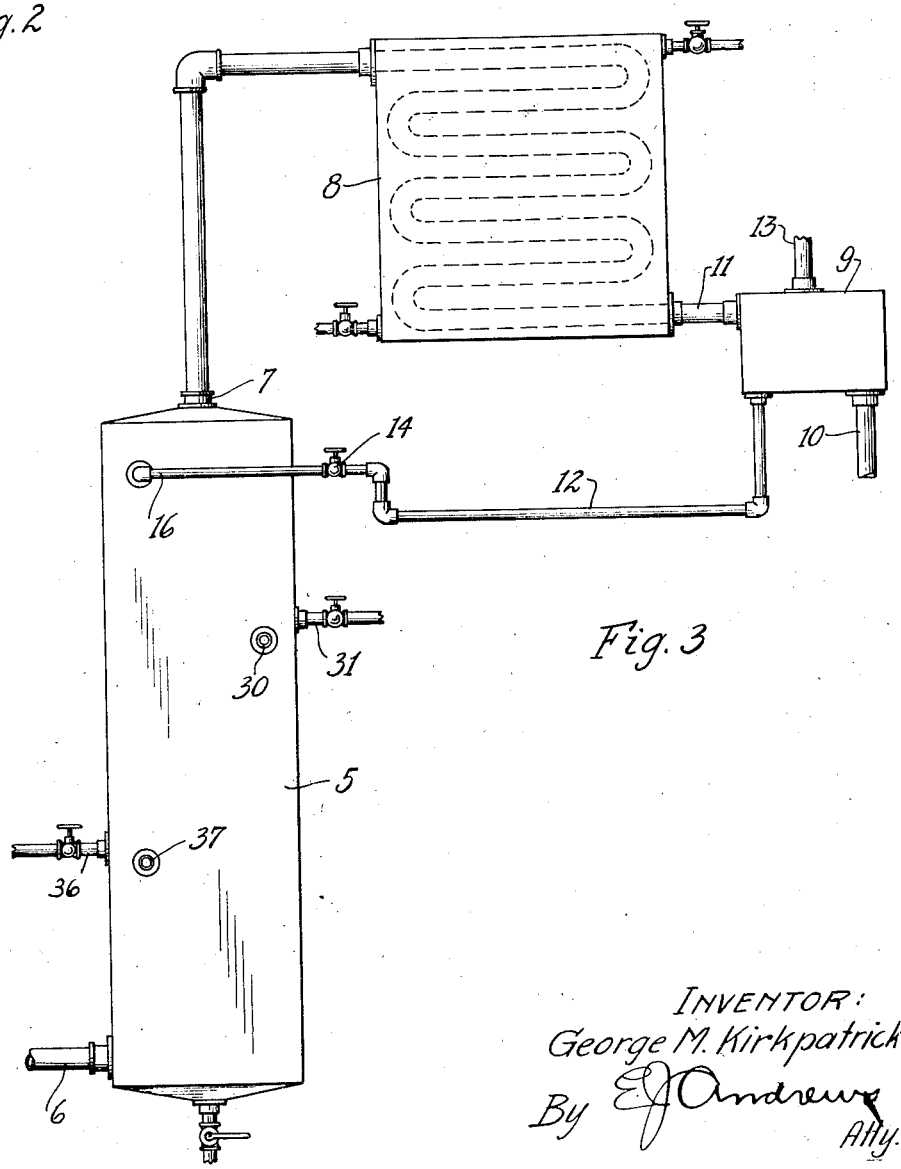

Referring to Fig. 3, the separating apparatus is enclosed in a casing 5. The gas or vapor which is to be purified is supplied in any suitable manner, such as by means of an ordinary still or otherwise, to the purifying apparatus through an inlet 6, and the vapor passes through the apparatus as hereinafter described and out through an outlet 7. The vapor may then be passed wherever desired but a common method is to pass the vapor to a condenser 8 where a portion of the vapor is to be condensed and the remaining vapor and the condensed liquid passes into a mechanical entrainment separator casing 9, through an inlet 11, and certain portions of the liquid passes out through an outlet 10 to wherever it is desired to store or use the liquid, and other portions of the liquid through a pipe 12 back into the separating apparatus in the casing 5. The vapor or gas which is not condensed passes out of the casing 9 through a pipe 13.

Although the apparatus which I provide may be used for a large variety of purposes, yet for the purpose of illustrating my invention I will describe it as used in the fractional distillation of petroleum for the purpose of obtaining gasoline and various by-products. In this case a vapor passing through the condenser 8 is partly condensed in the form of benzine, or some similar product, and the gasoline passes out of the outlet 10 as a gas and may then be condensed, or if desired the entire gas may be condensed in the condenser 8.

Referring to Fig. 1 the separating apparatus which I provide comprises a series of banks of baffles 15 suitably mounted in the casing 5 and arranged so that the vapor or gas to be purified passes through these banks in series, the banks forming what may be termed a cascade of separators. The gas entering at the inlet 6 passes, in the direction of the arrows, through each of the banks working upwardly through the casing and finally passing out of the casing through the outlet 7. The baffles are arranged somewhat as indicated in Fig. 2 so that the gas is required to take a long circuitous route in passing through the banks or baffles, continually coming in contact with the sides of the baffles; and this alone is sufficient to materially purify and separate the gases. The vapors condense more or less and, passing down the walls of the baffles, carry with them any impurities that may be present. However, to improve the separating and cleaning process I apply to certain of these baffles certain liquids which materially assist in the process.

This invention is an improvement on my invention which is fully set forth in my patent application Serial #699,809 filed March 17, 1924, and reference may be had to that application for details thereof which are not material to the present application.

In order to properly apply a liquid to the walls of some of the baffles I insert a liquid inlet pipe 16 which, in this instance, is connected with the mechanical separator casing 9 and receives the benzine or other liquid which has been condensed in the casing 8. The benzine is passed through line 16 and its flow is controlled by a valve 14 from which it passes into a distributing pipe 17 which runs across the front upper portion of the baffles 18 and has openings facing towards the baffles. These openings may comprise nozzles 19 if desired, and through these openings the benzine is sprayed into the spaces between the baffles and so as to cover the surfaces of the baffles, particularly those adjacent to the distributing pipe. This benzine runs down the surfaces of the baffles and is also carried more or less by the gases through the baffles to the rear surfaces of the baffles of the bank, so that in practice the surfaces of the baffles of the first bank 18 are more or less covered with the liquid. The liquid then runs down and along the partition 20, it being understood that the partitions 20 and 21 extend from one side of the casing to the other and prevent the gases from going from the compartment 22 to the compartment 23 without passing through the baffles.

The liquid runs along the partition 20 and does not materially affect the baffles in the bank 24, the walls of these baffles remaining substantially dry, and thus performing the function of separating any liquid particles from gases that may be passing through. The liquid, however, runs along the partitions 20 and 25 into the pan 26 which is mounted on the bank of baffles 27; and this pan 26 has a large number of perforations 43 in its bottom through which the benzine flows into the bank of baffles 27, the perforations 43 being arranged so that the surfaces of these baffles are coated with the benzine. The benzine flows down along the partition 28 to the pan 29, and, if desired, this same liquid may be caused to flow continuously in the same manner through all of the outer banks of baffles, it being understood that all of the inner banks remain substantially dry.

However, it often becomes desirable to use other liquids than the ordinary reflux liquid for at least a portion of the cleansing work. For instance a liquid such as kerosene may be used. In such a case I arrange to have the reflux liquid flow out of the casing through an outlet 30 and to have the other liquid flow into a casing through an inlet 31. This denser liquid may be supplied in any desired manner, and may be a reflux liquid if preferred. I prefer for the purpose kerosene and it passes from the inlet 31 into the distributing pipe 32 which corresponds in general to the distributing pipe 17. The kerosene is sprayed into the bank of baffles 33, and flows down the walls of the baffles and along the partition 34 into the distributing pan 35, and so on in the same manner as the benzine flowed through the upper sets of banks. The kerosene then may be passed out of the outlet 36 and another liquid, such as gas oil, may be passed in at the inlet 37 to the distributing pipe 38. This gas oil is then used to moisten the surface of the outer banks as it flows downward, and it finally flows through the passageway 39 and out of the outlet 40, its function being substantially the same as that of the benzine and kerosene above described.

In this manner I provide means for manipulating the gas to be purified in various ways. It first passes through the outer baffles 15, which are coated with a comparatively dense liquid, and it is brought very intimately into contact with the liquid in its circuitous path through the bank, so that it is very thoroughly scrubbed by the liquid and many of the impurities are absorbed thereby; the particles of carbon or other impurities flow down with the liquid into the chamber 41 in the bottom of the casing and out through the outlet 40. The gas then passes through the inner bank of baffles and the particles of liquid carried by the gas adhere to the surfaces of these baffles and flow downwardly into the oil at the bottom; so that the undesirably solid and liquid particles are eliminated for the gas.

The velocity of the gas is materially increased while passing through the banks, as the passageways are comparatively smaller, and this, as is well understood, increases the efficiency of the apparatus. But upon passing into the chamber 42, the cross section of which is much greater, the velocity of the gas therein is much less than through the baffles. As a consequence denser particles of liquid or solid which may be carried along with the gas are precipitated owing to the slow speed in the passageway. This separating process is repeated through each of the three lower pairs of baffles, and is then repeated through the baffles in the central portion of the casing. These central baffles, being coated with the less dense kerosene, the absorption process is more effective in eliminating the undesirable gases and liquids. The process is thus repeated until the reflux benzine is reached when a still more sensitive absorbing and vaporizing process is carried out with the benzine, and remaining impurities are separated from the gasoline vapor which is passing through the cascade.

I have thus provided a system comprising a series of wet baffles alternating with substantially dry baffles; the latter thus provide for the separation of any liquid particles tending to be carried by the vapor stream leaving the wet baffle banks. By this means, a dry clean vapor is delivered to each wet baffle bank so that more effective heat interchange and selective absorption takes place than would be the case were the vapor stream entering each wet baffle bank contaminated by high boiling point liquid fractions mechanically entrained in that stream.

The multiplicity and staggered arrangement of the wet baffles causes division of the main vapor streams, entering these baffles, into thin ribbons which must serpentine their way through these baffles, thereby materially assisting in the complete heat interchange between the liquid and the vapor stream, and also assisting towards the maximum degree of selective absorption of liquid and vaporous phase material of closely related molecular structure.

It will of course be understood that this process may be carried through with various other liquids, and as many banks of baffles as is desired may be used. The reflux, or other liquids used, may be modified as desired and modifications within the spirit of my invention may be made in the apparatus herein described. Furthermore the process is not to be considered as limited in any way to the purification of gasoline or even to fractional distillation, as it may be applied to the separating or purifying of various gases or vapors under various conditions.

I claim as my invention:

1. A fluid separator comprising a casing having an inlet and an outlet, a plurality of banks of baffles in said casing between said inlet and outlet, said banks being arranged in pairs, means for passing a liquid through one only of the banks of each pair, and means for passing a gas through each of said banks successively.

2. A fluid separator comprising an elongated casing, a plurality of partitions extending transversely of said casing and separating said casing into a plurality of chambers, each of said partitions having an opening therethrough adjacent one side of said casing, said openings being staggered with reference to each other, elongated trough baffles vertically mounted in each of said chambers, a gas inlet and a liquid outlet at one end of said casing, a gas outlet at the other end of said casing, and means for passing a liquid in front of and into some of said baffles.

3. A fluid separator comprising a casing, a gas inlet in one end of said casing and a gas outlet in the other end of said casing, a transverse partition in said casing, said partition having an opening therethrough adjacent one side of said casing, a series of vertical baffles mounted on the said partition adjacent said opening, a second partition extending above said baffles towards the center of said casing, means for passing a liquid into the upper ends of some of said baffles, a pan mounted in said first mentioned partition at one side of said baffles, said pan having a plurality of perforations therethrough, a second series of baffles mounted beneath said pan, a transverse partition in the said casing beneath said second series of baffles and having an opening therethrough whereby a gas passing into said inlet will pass through both of said series of baffles and out of said outlet.

4. A fluid separator comprising an elongated casing adapted to be vertically mounted, a gas inlet and a liquid outlet at one end of said casing, and a gas outlet at the other end of said casing, a plurality of transverse partitions in said casing spaced apart, said partitions forming chambers in said casing, each of said partitions having an opening therethrough connecting the adjacent chambers, whereby gas entering said gas inlet will pass successively through said chambers and out of said outlet, a plurality of baffles in each of said chambers extending vertically from one partition to the other, means for passing a liquid between the baffles of the upper chamber, and means for directing said liquid downwardly successively through said other series of baffles.

5. A fluid separator comprising an elongated casing adapted to be vertically mounted, a gas inlet and a liquid outlet at the lower end of said casing, and a gas outlet at the other end of said casing, a plurality of transverse partitions in said casing spaced apart, said partitions forming chambers in said casing, each of said partitions having an opening therethrough connecting the adjacent chambers, whereby gas entering said gas inlet will pass successively through said chambers, and out of said outlet, a series of baffles in each of said chambers extending vertically from one partition to the other, means for passing a liquid between the upper series of baffles, means for directing said liquid downwardly successively through the other series of baffles, means for passing said liquid out of said casing after it has passed through some of said series of baffles, and means for passing another liquid into the other series of baffles and downwardly and out from said casing.

In testimony whereof, I hereunto set my hand.

GEORGE M. KIRKPATRICK.